(12) United States Patent
Goodman et al.

(10) Patent No.: US 7,979,593 B2
(45) Date of Patent: Jul. 12, 2011

(54) NON-DISRUPTIVE LIBRARY RESET METHOD

(75) Inventors: Brian G. Goodman, Tucson, AZ (US); Leonard G. Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1778 days.

(21) Appl. No.: 11/147,920

(22) Filed: Jun. 8, 2005

(65) Prior Publication Data

US 2006/0282613 A1    Dec. 14, 2006

(51) Int. Cl.
*G06F 13/00* (2006.01)
(52) U.S. Cl. ............. 710/5; 710/104; 711/166; 713/100
(58) Field of Classification Search .......... 714/7; 710/5, 710/8, 104; 711/114, 166; 713/100
See application file for complete search history.

(56) References Cited

U.S. PATENT DOCUMENTS

| | | | |
|---|---|---|---|
| 6,105,103 A | 8/2000 | Courtright, II et al. | |
| 6,260,006 B1 | 7/2001 | Wong et al. | |
| 6,356,803 B1 | 3/2002 | Goodman et al. | |
| 6,434,090 B1 | 8/2002 | Basham et al. | |
| 6,629,158 B1* | 9/2003 | Brant et al. ..................... | 710/10 |
| 6,725,394 B1* | 4/2004 | Bolt ................................. | 714/7 |
| 6,728,833 B2 | 4/2004 | Pruett et al. | |
| 6,782,448 B2 | 8/2004 | Goodman et al. | |
| 2002/0161971 A1 | 10/2002 | Dimitri et al. | |
| 2003/0191982 A1* | 10/2003 | Arakawa et al. ................... | 714/8 |
| 2004/0107320 A1* | 6/2004 | Gallo et al. ................... | 711/147 |
| 2004/0230579 A1 | 11/2004 | Burchfield | |
| 2005/0138248 A1* | 6/2005 | Goodman et al. ............... | 710/74 |
| 2006/0112302 A1* | 5/2006 | Cherian ........................... | 714/6 |
| 2008/0015734 A1* | 1/2008 | Wideman et al. ............. | 700/214 |

* cited by examiner

*Primary Examiner* — Alford W Kindred
*Assistant Examiner* — Ernest Unelus
(74) *Attorney, Agent, or Firm* — David W. Victor; Konrad Raynes & Victor LLP (57) ABSTRACT

A library is reset as needed in a manner non-disruptive to a host system providing a host command to a drive interfacing with the host system on behalf of the library during a reset of the library. To this end, the drive confirms a receipt of a host command to the host system on behalf of the library in response to the drive receiving the host command from the host system, and the library commands the drive to transmit the host command to the library subsequent to a reset of the library based on the drive receiving the host command from the host system during the reset of the library.

20 Claims, 10 Drawing Sheets

NON-DISRUPTIVE LIBRARY RESET METHOD

FIELD OF INVENTION

The present invention generally relates to systems employing a library and drives for interfacing with host systems to receive host commands from the host systems on behalf of the library. The present invention specifically relates to resetting the library in a manner non-disruptive to host systems providing the host commands to the drives.

BACKGROUND OF THE INVENTION

Typically, host commands go through a host/drive interface before reaching a library. For a fuller understanding of the aforementioned use of a data storage drive for providing a host interface for host commands, please refer to U.S. Pat. No. 6,434,090, entitled "Automated Data Storage Library with Control Path to Shared Robotic Device Via Media Drive" and issued Aug. 13, 2002, an entirety of which is incorporated herein by reference.

During the course of the drive receiving host commands from a host on behalf of the library, it may become necessary for a library controller to perform a self reset. For example, a library reset may be necessary to activate new firmware after a successful execution of a library firmware update. In another example, a library reset may be necessary to recover from a hardware and/or software error within the library. A drawback with the library controller performing a self reset is that it may be disruptive to normal operation of the host system. A challenge therefore for the storage industry is to perform a library reset in a manner non-disruptive to a host system.

SUMMARY OF THE INVENTION

The present invention provides a new and unique method for resetting the library in a manner non-disruptive to a host system.

One form of the present invention is a system comprising a drive controller and a library controller operably coupled to the drive controller. The drive controller includes a drive processor and a drive memory storing drive instructions operable with the drive processor, wherein the drive instructions are executable for confirming a receipt of a host command to a host system on behalf of a library in response to a drive receiving the host command from the host system. The library controller includes a library processor and a library memory storing library instructions operable with the library processor, wherein the library instructions are executable for commanding the drive controller to transmit the host command to the library subsequent to a reset of the library based on the drive receiving the host command from the host system during the reset of the library.

A second form of the present invention is a system comprising a drive and a library operably coupled to the drive. The drive is operable to confirm a receipt of a host command to a host system on behalf of the library in response to the drive receiving the host command from the host system. The library controller is operable to command the drive to transmit the host command to the library subsequent to a reset of the library based on the drive receiving the host command from the host system during the reset of the library.

A third form of the present invention is a signal bearing medium tangibly embodying a program of machine-readable instructions executable by a processor to perform operations for operating a drive. The operations comprise confirming a receipt of a host command to a host system on behalf of a library in response to receiving the host command from the host system, queuing the host command, and transmitting the queued host command to the library in response to being commanded by the library to transmit the queued host command to the library subsequent to a reset of the library.

A fourth form of the present invention is a signal bearing medium tangibly embodying a program of machine-readable instructions executable by a processor to perform operations for operating a library. The operations comprising determining a successful completion of a reset of the library, wherein a drive queues any host commands received by the drive from a host system on behalf of the library during the reset of the library, and commanding the drive to transmit any queued host command to the library subsequent to the successful completion of the reset of the library.

The forgoing forms and other forms, objects, and aspects as well as features and advantages of the present invention will become further apparent from the following detailed description of the various embodiments of the present invention, read in conjunction with the accompanying drawings. The detailed description and drawings are merely illustrative of the present invention, rather than limiting the scope of the present invention being defined by the appended claims and equivalents thereof.

DETAILED DESCRIPTION OF THE INVENTION

This invention is described in preferred embodiments in the following description with reference to the Figures, in which like numerals represent the same or similar elements.

While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
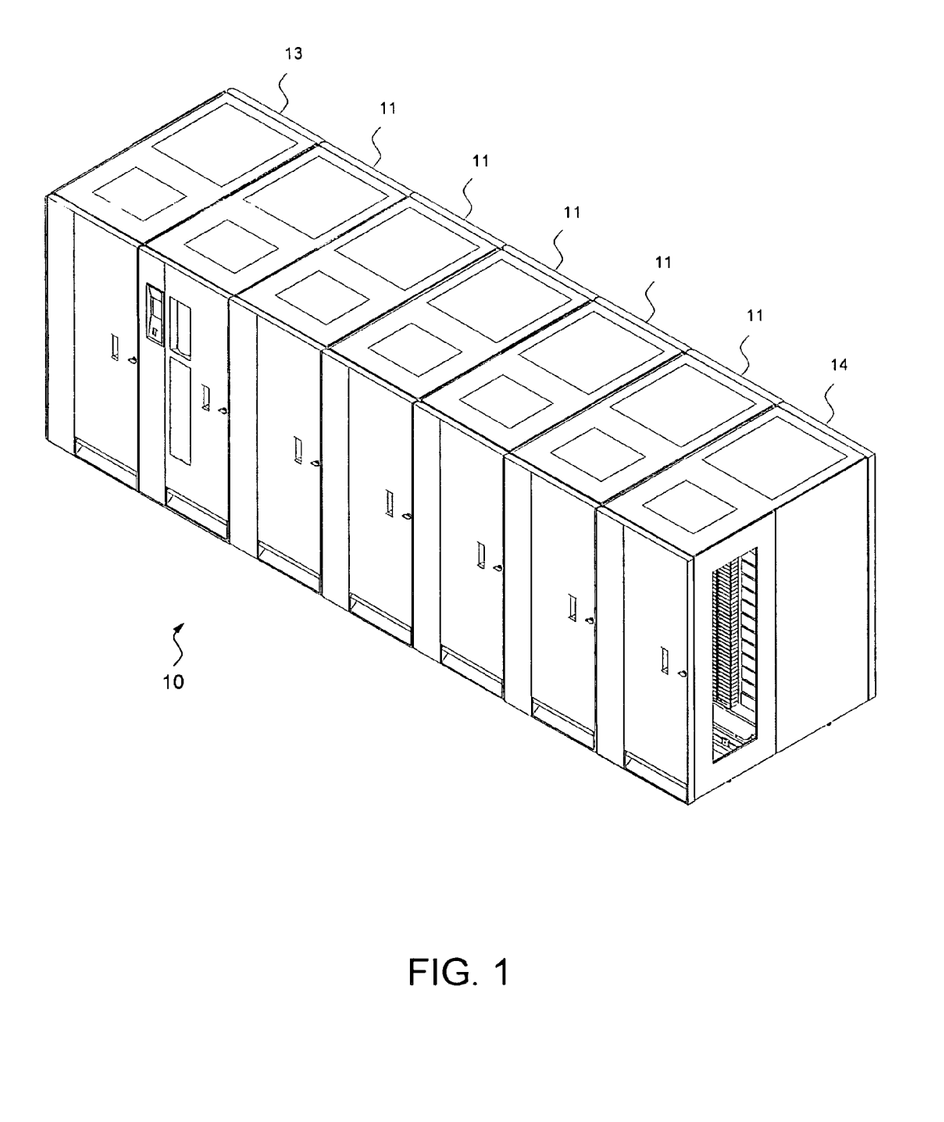
FIG. 1 is an isometric view of an automated data storage library adaptable to implement an embodiment of the present invention, with the view specifically depicting a library having a left hand service bay, multiple storage frames and a right hand service bay.
Figure 2:
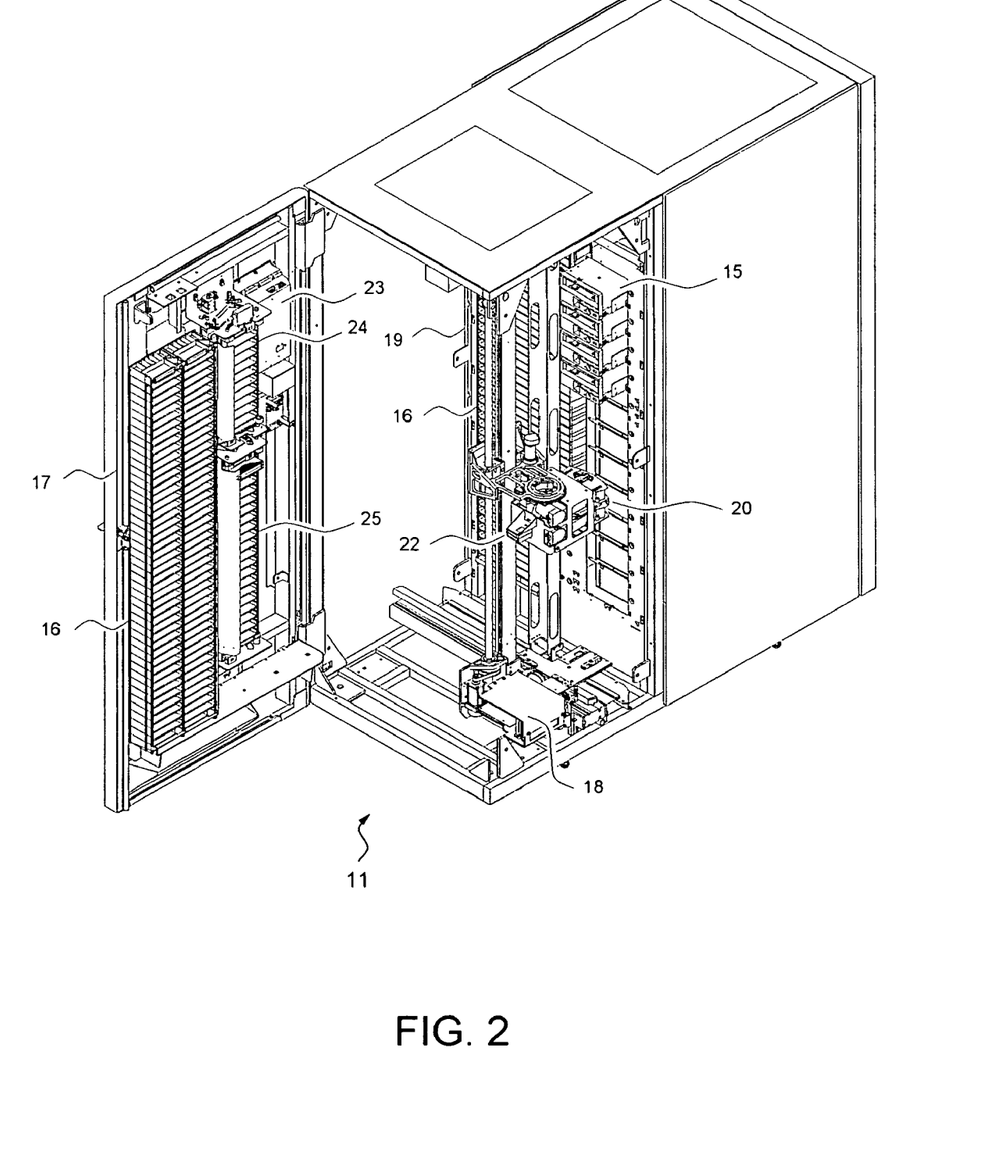
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16 on front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
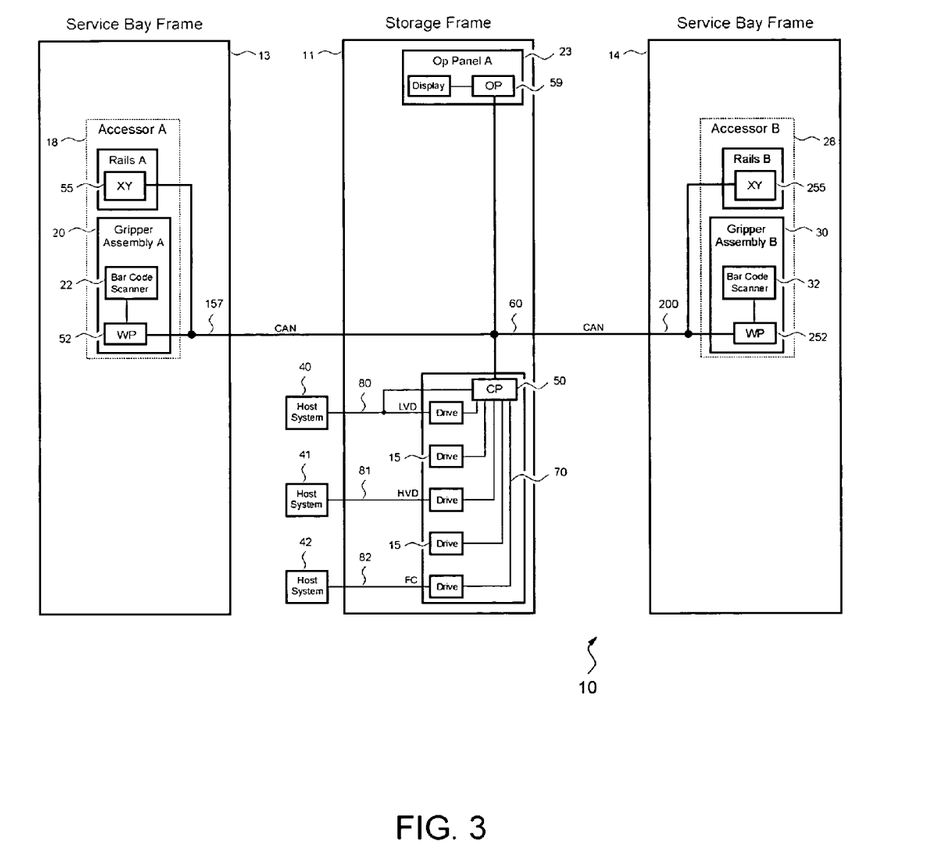
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
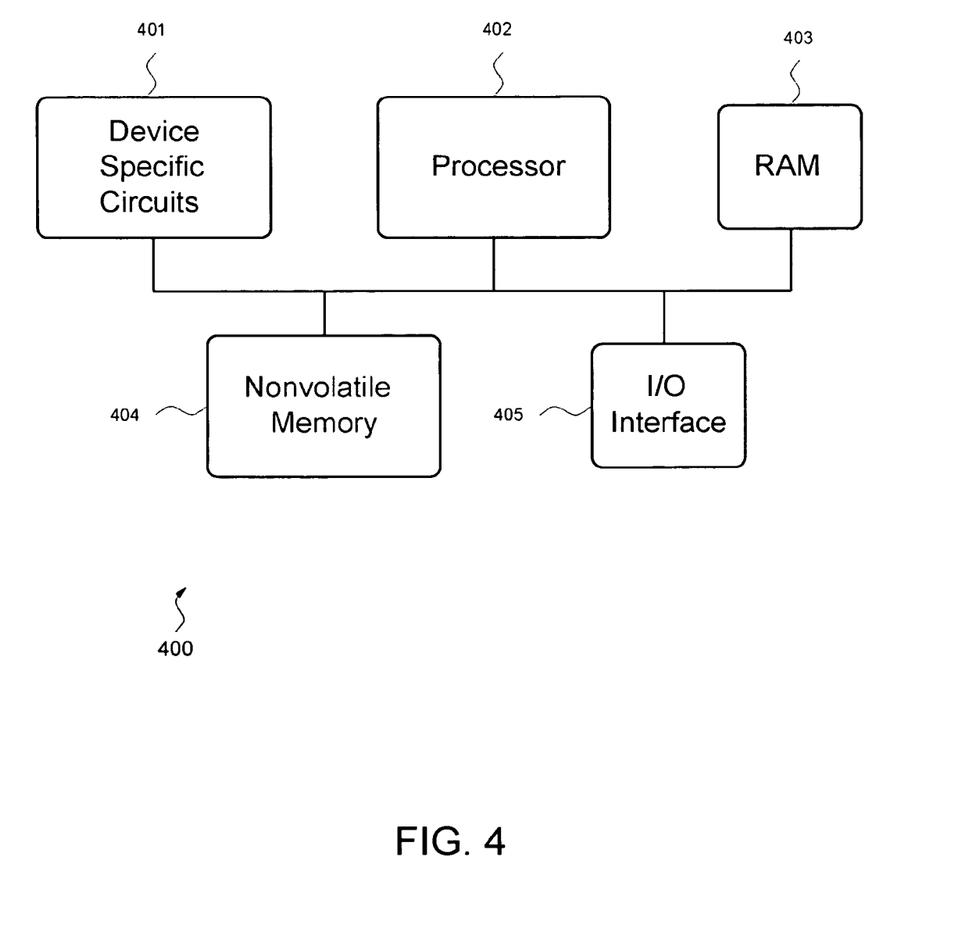
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), MRAM (Magnetoresitive Random Access Memory), battery backup RAM, hard disk drives, etc. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), SCSI (Small Computer Systems Interface), etc. The device specific circuits 401 may provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library or it may comprise one or more processor nodes of a distributed control system. Herein, library controller may comprise a single processor or controller or it may comprise multiple processors or controllers.

Figure 5:
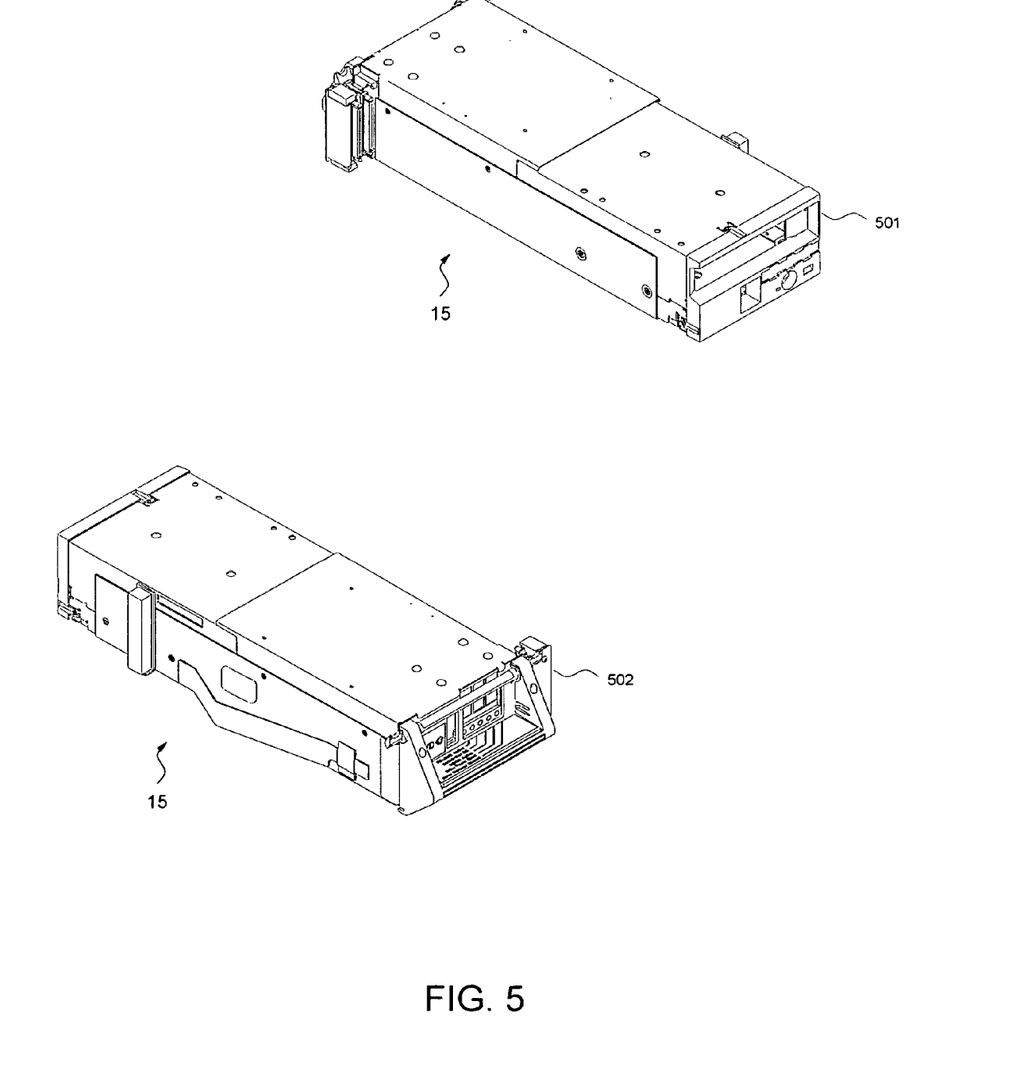
FIG. 5 is an isometric view of the front and rear of a data storage drive adaptable to implement an embodiment of the present invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
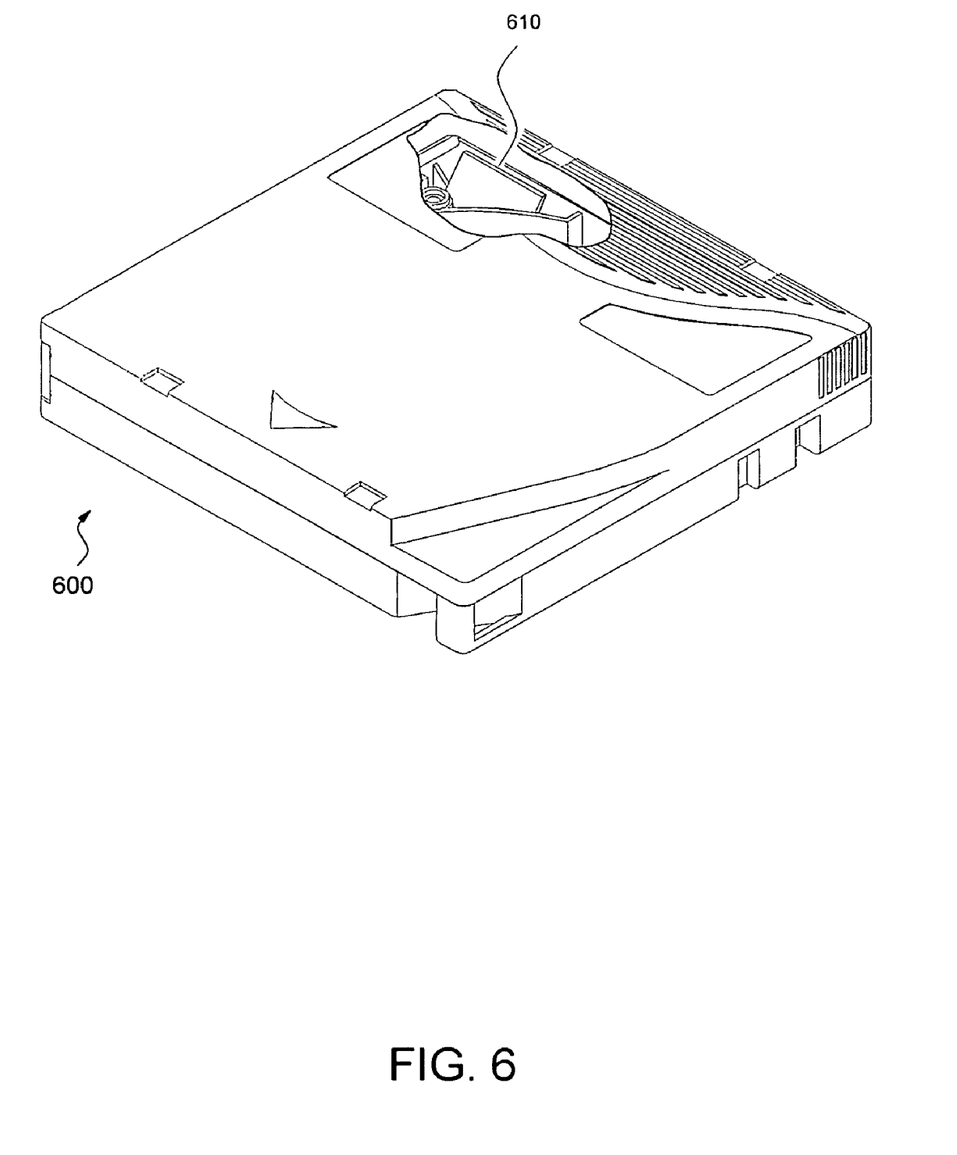
FIG. 6 is an isometric view of a data storage cartridge adaptable to implement an embodiment of the present invention.

FIG. 6 illustrates an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory.

Referring to FIGS. 1-3, it may become necessary for one or more library controllers of library 10 (e.g., communications processor node 50 shown in FIG. 4 structurally configured in accordance with FIG. 4) to perform a reset of library 10. For example, a library reset may be necessary to activate new firmware after a successful execution of a library firmware update of library 10. In another example, a library reset may be necessary to clear a hardware and/or software error within library 10. One or more library controllers of library 10 in conjunction with one or more drive controllers of a drive 15 (e.g., controllers structurally configured in accordance with FIG. 4) implement a non-disruptive library reset method of the present invention to prevent any disruption in an operation of a host system interfaced with drive 15 on behalf of library 10.

Figure 7:
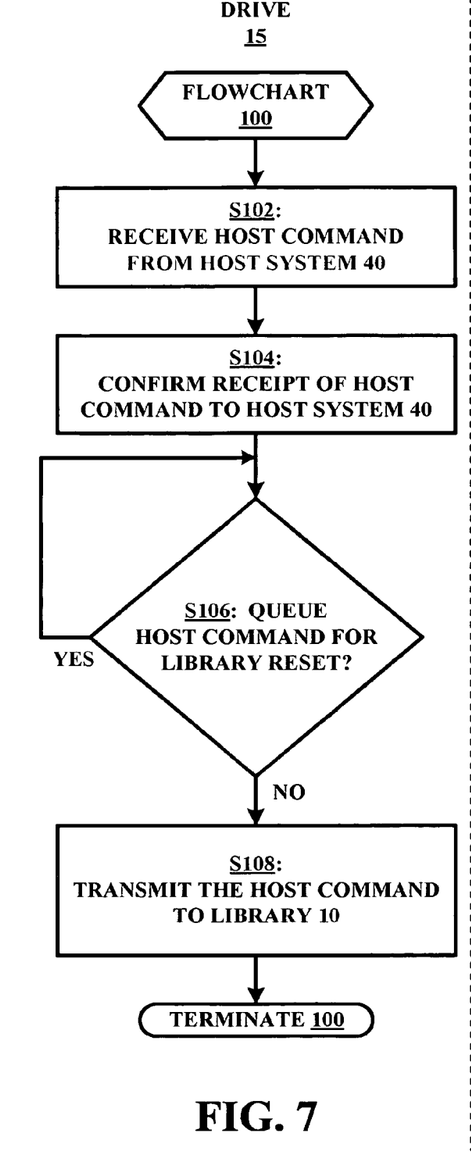
FIGS. 7 and 8 illustrate flowcharts representative of a first embodiment of a non-disruptive library reset method in accordance with the present invention.
Figure 8:
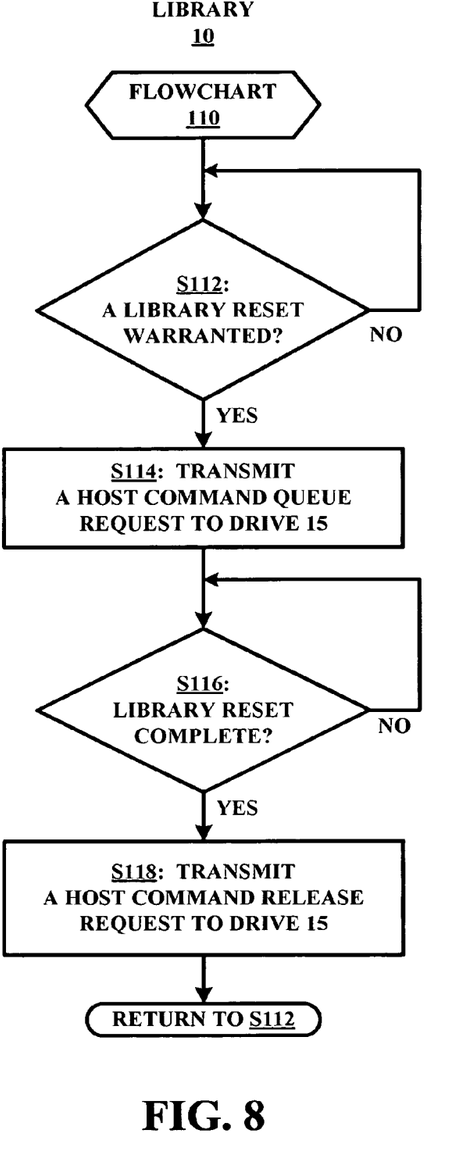

FIGS. 7 and 8 illustrate respective flowcharts 100 and 110, which are representative of the non-disruptive library reset method of the present invention as implemented by the drive controller of drive 15 (FIG. 3) and the library controller of library 10 (FIGS. 1 and 2), respectively. In practice, flowchart 100 encompasses drive 15 and flowchart 110 is implemented by library 10 in an asynchronous manner. However, to facilitate a general understanding of the non-disruptive library reset method of the present invention, flowchart 100 and flowchart 110 will now be described herein as if flowchart 100 is implemented by drive 15 and flowchart 110 is implemented by library 10 in a synchronous sequential manner based on the interfacing of drive 15 with host system 40 (FIG. 3).

First, a stage S102 of flowchart 100 encompasses drive 15 receiving a host command from host system 40. For purposes of the present invention, the term "host command" is broadly defined herein as a computer command originating from a host system and intended for processing by library 10 whereby library 10 may process the command or direct drive 15 to process the command. Examples of such host commands include, but are not limited to, a Move Medium command and a Test Unit Ready command.

Second, a stage S104 of flowchart 100 encompasses drive 15 confirming a receipt of the host command to host system 40. In one exemplary embodiment of stage S104, drive 15 transmits a host command receipt confirmation to thereby explicitly confirm receipt of the host command. In another exemplary embodiment, an implied transmission of command receipt constitutes a confirmation of a receipt of the host command by drive 15. For example, the SCSI bus protocol involves different bus phases and handshakes. With the SCSI protocol, there is no specific "command receipt" transmission but there may be implied receipt through proper low level SCSI communication.

Third, a stage S112 of flowchart 110 encompasses library 10 determining whether a library reset is warranted. As discussed above, a reset may be required to activate a library firmware update or to recover from an error condition. There may be other reasons to perform a library reset and the present invention is therefore not limited to any particular reason for library reset.

If a library reset is not warranted, then drive 15 determines during a stage S106 of flowchart 100 that the host command received during stage S102 should not be queued for purposes of a library reset and therefore drive 15 proceeds to a stage S108 of flowchart 100 to transmit the host command to library 10.

If a library reset is warranted, then library 10 proceeds to a stage S114 of flowchart 110 to transmit a host command queue request to drive 15 whereby drive 15 queues one or more host commands for purposes of the library reset during stage S106 of flowchart 100. The library reset may comprise a hardware reset. For example, the controller may have the means to initiate a reset or power down signal through a processor register, FPGA, ASIC, some other hardware register, a watchdog timer, etc. In addition, the library reset may comprise a software reset. For example, the library firmware may allow a watchdog timer to expire, or it may communicate with another processor or controller that has the capability to perform the reset. Still further, the software reset may comprise a software branch, jump, or call. For example, the library may execute firmware that initializes the library controller in a manner similar to how a reset would initialize the controller. Herein, software, firmware, and instructions all refer to processor executable instructions, as is known to those of skill in the art.

Upon library 10 determining the library reset is complete during a stage S116 of flowchart 110, library 10 proceeds to a stage S118 of flowchart 110 to transmit a host command release request to drive 15 whereby drive 15 proceeds to stage S108 to transmit one or more queued host commands to library 10. The host command release request of stage S118 may be an implied release. For example, there may be a handshake between library 10 and drive 15 that occurs when either the library or drives completes a reset or power-on. This handshake could be used as an implied release such that any time drive 15 receives a library 10 handshake it would release any queued commands to the library. In addition, determining that the library reset is complete at stage S116 may be an implied determination. For example, every controller contains certain initialization instructions or firmware that are executed after a power-on or reset. Executing these initialization instructions may imply that the library has completed some kind of reset and the library may not differentiate between a self reset and any other cause of reset. On the other hand, the library may differentiate between a self reset and another cause of reset by setting an indicator. The indicator may comprise a particular value stored in a nonvolatile memory location, a value stored in a hardware register not affected by a self reset, a value stored in a volatile memory location not affected by a self reset, the indicator may comprise status maintained by another processor that doesn't go through a self reset or resets at another time, etc. It should be noted that drive 15 may not receive any host commands during the library reset. In this case, no commands would be queued and no commands would be transmitted to library 10.

Figure 9:
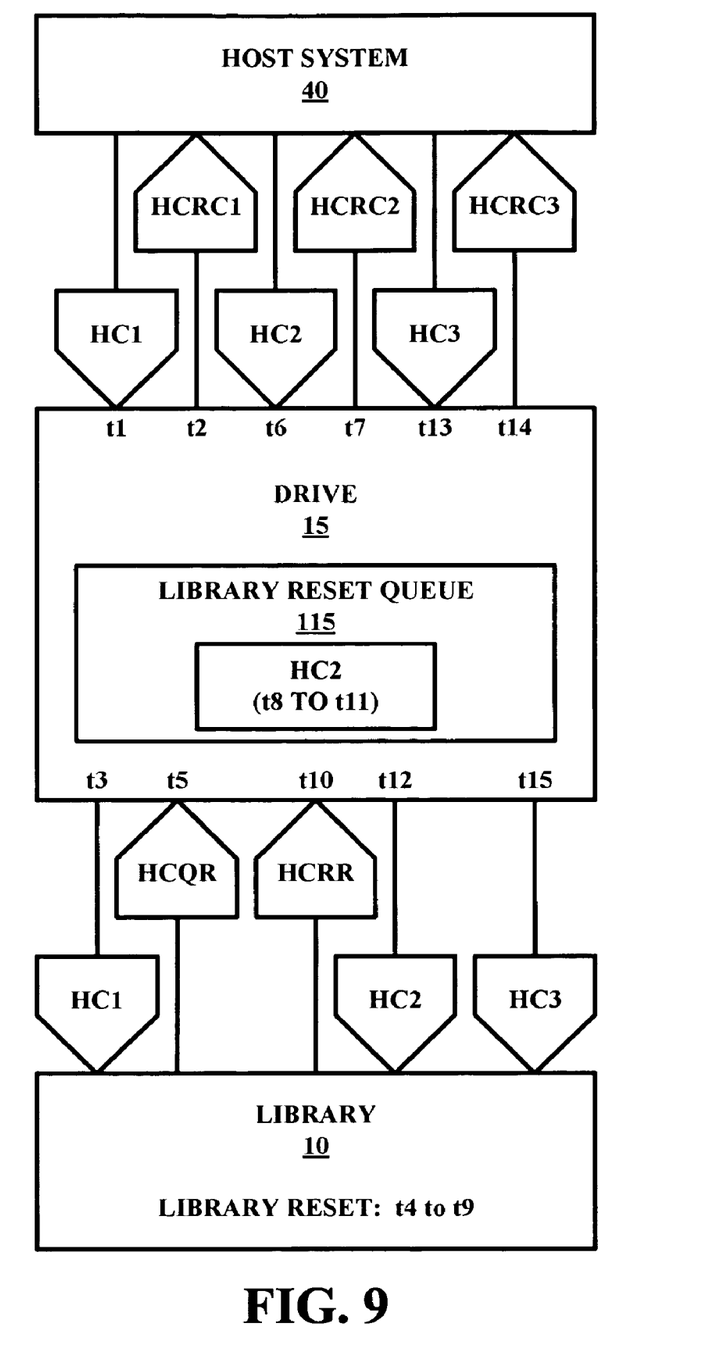
FIG. 9 illustrates an exemplary execution of the flowcharts illustrated in FIGS. 7 and 8.

To facilitate a specific understanding of flowcharts 100 and 110, FIG. 9 illustrates an exemplary execution of flowcharts 100 and 110 by drive 15 and library 10, respectively, in an asynchronous manner based on a arbitrary time unit t, from the perspective of drive 15 in the context of host system 40 transmitting three (3) host commands to drive 15, and in the context of a library reset being warranted between a time t4 and a time t9.

Referring to FIGS. 7-9, at a time t1, drive 15 receives a host command HC1 from host 40 (stage S102). At a time t2, drive 15 transmits a host command receipt confirmation HCRC1 to host system 40 (stage S104) as shown, or an implied confirmation is implemented by drive 15. At a time t3, drive 15 transmits the host command HC1 to library 10 (stage S108) in view of that fact that drive 15 has not received a host command queue request HCQR from library 10 prior to time t3 (stage 106).

At time t4, library 10 determines a library reset is warranted (stage S112). Library 10 commands drive 15 to hold one or more host commands by sending a host command queue request HCQR to drive 15 at a time t5 (stage 114). Herein, commanding refers to any command, communication, instruction, or other indication that one or more host commands should be held.

At a time t6, drive 15 receives a host command HC2 from host system 40 (S102). At a time t7, drive 15 transmits a host command receipt confirmation HCRC2 to host system 40 (stage S104) as shown, or an implied confirmation is implemented by drive 15. At a time t8, drive 15 stores the host command HC2 in a library reset queue 115 in view of the fact that drive 15 received host command queue request HCQR from library 10 prior to time t6 (stage S106).

At time t9, library 10 determines the library reset has been successfully completed (stage S116). Alternatively, library 10 may simply complete a reset without any knowledge that it had reset itself. This may occur, for example but without limitation, if the command release to drive 15 is an implied release. In either case, library 10 commands drive 15 to release one or more host commands by sending a host command release request HCRR to drive 15 at a time t10 (stage 118) whereby drive 15 recovers the host command HC2 from queue 115 at a time t11 and transmits the host command HC2 to library 10 at a time t12 (S108). Alternatively, the library 10 commanding drive 15 to release one or more host commands may be implied, as discussed above.

At a time t13, drive 15 receives a host command HC3 from host 40 (stage S102). At a time t14, drive 15 transmits a host command receipt confirmation HCRC3 to host system 40 (stage S104) as shown, or an implied confirmation is implemented by drive 15. At a time t15, drive 15 transmits the host command HC3 to library 10 (stage S108) in view of that fact that drive 15 has not received another host command queue request from library 10 between time t10 and time t15 (stage S106).

In practice, drive 15 may individually implement flowchart 100 for each host command received by drive 15 from host system 40. As such, those having ordinary skill in the art will appreciate the various advantages of the present invention from the description of FIGS. 7-9 herein, including, but not limited to, the non-disruptive manner by which drive 15 is able to receive host commands from a host system 40 on behalf of library 10, if any, during an execution of a library reset by library 10.

Figure 10:
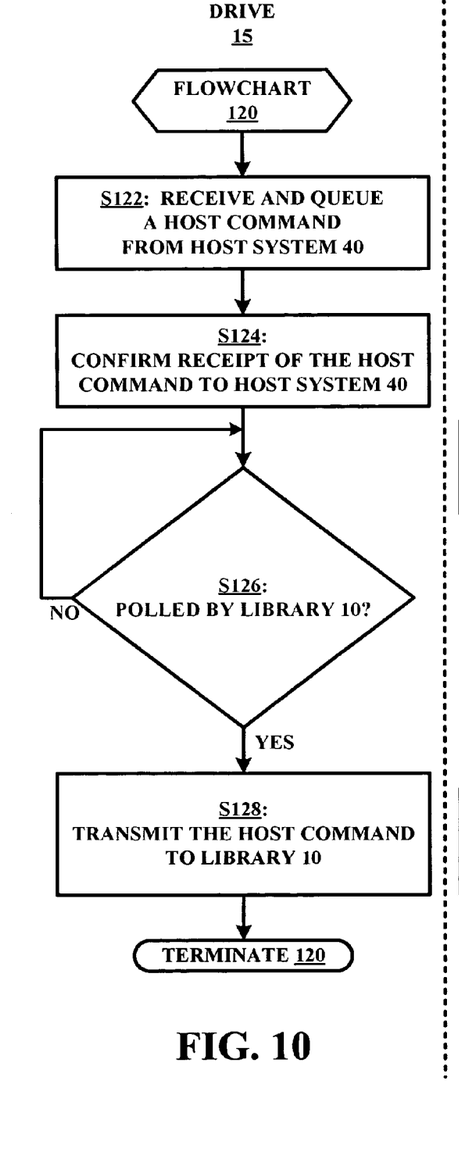
FIGS. 10 and 11 illustrate flowcharts representative of a second embodiment of a non-disruptive library reset method in accordance with the present invention.
Figure 11:
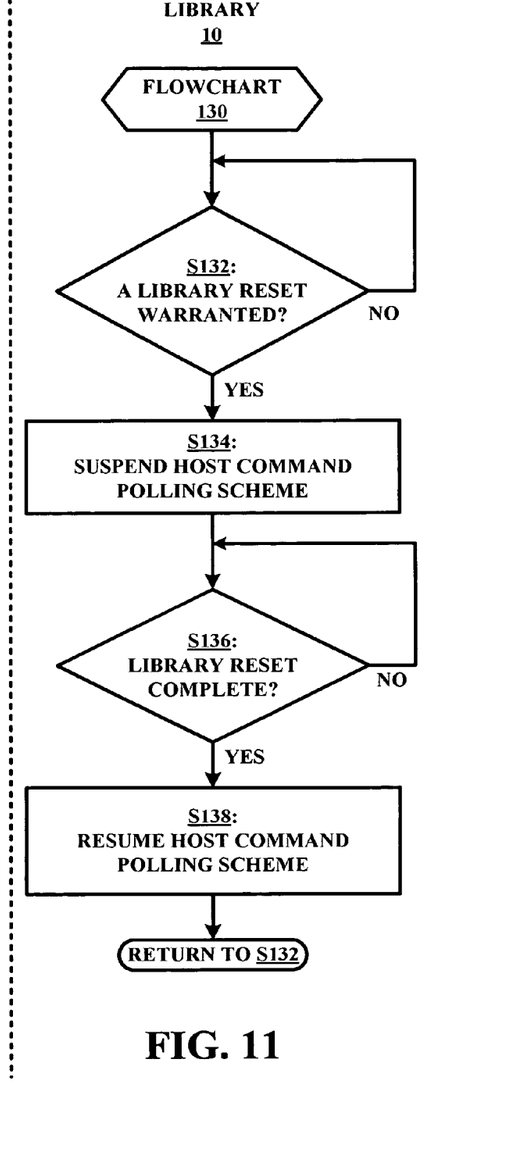

FIGS. 10 and 11 illustrate respective flowcharts 120 and 130, which are representative of another non-disruptive library reset method of the present invention as implemented by drive 15 and library 10, respectively, in the context of library 10 performing a host command polling scheme whereby drive 15 will only transmit received host commands when polled by library 10. In practice, flowchart 120 is implemented by drive 15 and flowchart 130 is implemented by library 10 in an asynchronous manner. However, to facilitate a general understanding of the non-disruptive library reset method of the present invention, flowchart 120 and flowchart 130 will now be described herein as if flowchart 120 is implemented by drive 15 and flowchart 130 is implemented by library 10 in a synchronous sequential manner while library 10 is concurrently implementing the host command polling scheme.

First, a stage S122 of flowchart 120 encompasses drive 15 receiving and queuing a host command from host system 40. Second, a stage S124 of flowchart 120 encompasses drive 15 confirming a receipt of the host command to host system 40. The command confirmation may be implied, as discussed above. Third, stage S132 of flowchart 130 encompasses library 10 determining whether a library reset is warranted.

If a library reset is not warranted, then drive 15 proceeds to a stage S128 of flowchart 120 to transmit the queued host command to library 10 upon being polled by library 10 during stage S126. The polling by library 10 to drive 15 may comprise any form of command, status, communication, etc. that may indicate to the drive 15 that any queued library commands may be sent. This polling may be implied. For example, the library 10 may send status to the drive 15 indicating that it is currently operational. This status may imply that one or more queued commands may be sent to the library 10.

If a library reset is warranted, then library 10 proceeds to a stage S134 of flowchart 130 to suspend the host command polling scheme. The suspension of stage S134 may be implied. For example, this stage may simply comprise library 10 resetting itself. In this example, host command polling would be suspended because library 10 cannot poll for host commands while it is conducting a reset. One example of where stage S134 may not be an implied suspension of polling comprises a library 10 that has more than one processor or controller. In this example, one processor may reset while the other processor suspends host command polling.

At stage S136 of flowchart 130, library 10 determines if the library reset is complete. This stage may be implied. For example, if library 10 comprises a single controller or processor, or if all controllers or processors associated with library 10 are reset at the same time, then there may not be a need for a specific reset complete check. On the other hand, it may be desired to monitor the reset status of individual controllers or processors. The library 10 proceeds to stage S128 of flowchart 130 to resume the host command polling scheme whereby drive 15 transmit the queued host command to library 10 during stage S128 upon being polled by library 10 during stage S126.

Figure 12:
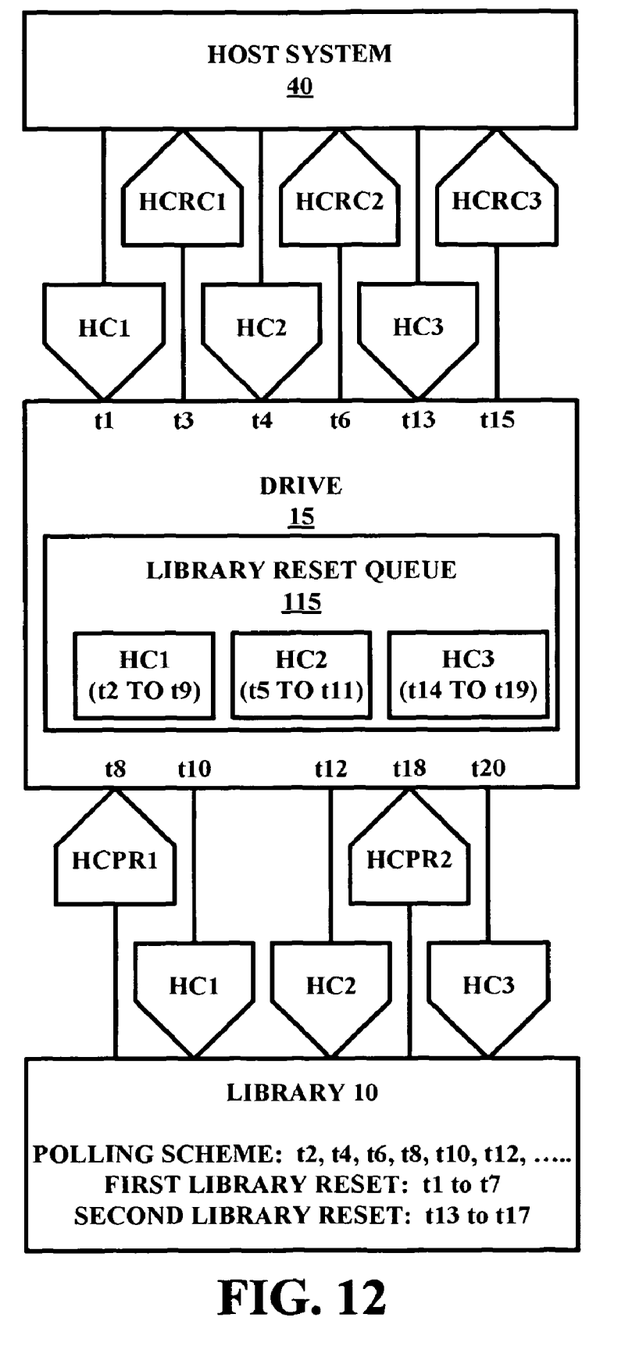
FIG. 12 illustrates an exemplary execution of the flowcharts illustrated in FIGS. 10 and 11.

To facilitate a specific understanding of flowcharts 120 and 130, FIG. 12 illustrates an exemplary execution of flowcharts 120 and 130 by drive 15 and library 10, respectively, in an asynchronous manner, from the perspective of drive 15 in the context of host system 40 transmitting three (3) host commands to drive 15, in a context of a host command polling scheme being implemented by library 10 based on the even time units t, in the context of a first library reset being warranted between a time t1 and a time t7, and in the context of a second library reset being warranted between a time t13 and a time t17.

Referring to FIGS. 10-12, at a time t1, drive 15 receives a host command HC1 from host 40 (stage S122), and library 10 suspends the host command polling scheme (S134) in view of the need for the first library reset at time t1 (S132). Stage S134 may be an implied stage, as discussed above. At a time t2, drive 15 queues the host command HC1 in queue 115 (stage S122). At a time t3, drive 15 optionally transmits a receipt confirmation RC1 to host system 40 (stage S124) as shown or an implied confirmation may be implemented by drive 15. Alternatively, if optional stage S134 is present, it may occur after receiving the host command in stage S122, but prior to queuing the host command.

At a time t4, drive 15 receives a host command HC2 from host 40 (stage S122). At a time t5, drive 15 queues the host command HC2 in queue 115 (stage S122). At a time t6, drive 15 optionally transmits a receipt confirmation RC2 to host system 40 (stage S124) as shown or an implied confirmation is implemented by drive 15.

At time t7, library 10 determines the library reset has been successfully completed (stage S136). Alternatively, library 10 may simply complete a reset without any knowledge that it had reset itself, as discussed above. In either case, drive 15 receives a host command poll request HCPR1 from library 10 at a time t8 (stage S138) in accordance with the host command polling scheme. As such, drive 15 recovers host command HC1 from queue 115 at a time t9 (S126) and transmits the host command HC1 to library 10 at a time t10 (S128), and recovers host command HC2 from queue 115 at a time t11 (S126) and transmits the host command HC2 to library 10 at a time t12 (S128).

At a time t13, drive 15 receives a host command HC3 from host 40 (stage S122), and library 10 suspends the host command polling scheme (S134) in view of the need for the second library reset at time t13 (S132). At a time t14, drive 15 queues the host command HC3 in queue 115 (stage S122). At a time t15, drive 15 optionally transmits a receipt confirmation RC3 to host system 40 (stage S124) as shown or an implied confirmation is implemented by drive 15.

At time t17, library 10 determines the second library reset has been successfully completed (stage S134). Drive 15 therefore receives a host command poll request HCPR2 from library 10 at a time t18 (stage S138) in accordance with the host command polling scheme. As such, drive 15 recovers host command HC3 from queue 115 at a time t19 (S126) and transmits the host command HC3 to library 10 at a time t20 (S128).

In practice, drive 15 may individually implement flowchart 120 for each host command received by drive 15 from host system 40. As such, those having ordinary skill in the art will appreciate the various advantages of the present invention from the description of FIGS. 10-12 herein including, but not limited to, the non-disruptive manner by which drive 15 is able to receive host commands from a host system 40 on behalf of library 10, if any, during an execution of a library reset by library 10.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A data storage library system in communication with a host system to receive Input/Output requests from the host system directed to data storage media in data storage cartridges maintained in the library, comprising
    a drive controller including a drive processor and a drive memory storing drive instructions executed by the drive processor,
    wherein the drive instructions are executed to confirm a receipt of a host command to the host system on behalf of a library in response to a drive receiving the host command from the host system directed to one of the data storage cartridges, wherein during a reset of the library the drive instructions are executed by the drive controller to queue host commands received from the host system and confirm receipt of the queued host commands to the host system during the reset of the library; and
    a library controller coupled to the drive controller, the library controller including a library processor and a library memory storing library instructions executed by the library processor, wherein in response to the reset, the library controller executes initialization instructions to initialize the library,
    wherein the library instructions are executed to command the drive controller to transmit the host commands, queued during the reset of the library, to the library in response to a complete of the reset of the library and the execution of the initialization instructions.

2. The system of claim 1, wherein the library controller instructions are further executed to perform commanding the drive controller to queue the host commands received during the reset in response to determining the reset of the library is warranted.

3. The system of claim 2, wherein the drive instructions are further executed to queue the host commands in response to being commanded by the library controller to queue the host commands.

4. The system of claim 2, wherein commanding the drive controller to transmit the queued host commands to the library in response to the complete of the reset of the library further includes:
    commanding the drive controller to transmit the queued host commands to the library in response to the successful completion of the library reset.

5. The system of claim 4, wherein the drive instructions are further executed to perform:
    queuing the host commands during the reset in response to being commanded by the library controller to queue the host commands; and
    transmitting the queued host commands to the library in response to being commanded by the library controller to transmit the queued host commands to the library.

6. The system of claim 1, wherein commanding the drive controller to transmit the host commands to the library, received during the reset of the library, in response to the complete of the reset of the library includes:
    executing a host command polling scheme based on the reset of the library.

7. The system of claim 6, wherein executing the host command polling scheme based on the reset of the library includes:
    suspending the host command polling scheme during the reset of the library; and
    resuming the host command polling scheme in response to the complete of the reset of the library.

8. A system in communication with a host system, comprising
   a data storage library including data storage media in data storage cartridges and a library controller;
   a drive coupled to the library and configured to confirm a receipt of a host command to the host system on behalf of the library in response to the drive receiving the host command from the host system directed to the data storage cartridges, wherein during a reset of the library, the drive queues host commands received from the host system and confirms receipt of the queued host commands to the host system during the reset of the library, wherein in response to the reset, the library controller executes initialization instructions to initialize the library; and
   wherein the library controller is configured to command the drive to transmit the host commands, queued during the reset of the library, to the library in response to a complete of the reset of the library and execution of the initialization instructions.

9. The system of claim 8, wherein the library controller further performs commanding the drive to queue the host commands received during the reset in response to determining the reset of the library is warranted.

10. The system of claim 9, wherein the drive queues the host commands in response to being commanded by the library controller to queue the host commands.

11. The system of claim 9, wherein commanding the drive to transmit the queued host commands to the library in response to the complete of the reset of the library further includes:
   commanding the drive to transmit the queued host commands to the library in response to the successful completion of the library reset.

12. The system of claim 11,
   wherein the drive is further configured to queue the host commands during the reset in response to being commanded by the library controller to queue the host commands; and
   wherein the drive is further configured to transmit the queued host commands to the library in response to being commanded by the library controller to transmit the queued host commands to the library.

13. The system of claim 8, wherein commanding the drive to transmit the host commands to the library, received during the reset of the library, in response to the complete of the reset of the library includes:
   executing a host command polling scheme in response to the complete of the reset of the library.

14. The system of claim 13, wherein executing the host command polling scheme based on the reset of the library includes:
   suspending the host command polling scheme during the reset of the library; and
   resuming the host command polling scheme in response to the complete of the reset of the library.

15. A computer readable storage device storing a program of machine-readable instructions executed by a processor to perform operations for operating a drive in a data storage library including a library controller controlling access to data storage media in data storage cartridges, wherein the data storage library is in communication with a host system to receive Input/Output requests from the host system directed to the data storage cartridges, the operations comprising:
   confirming a receipt of a host command to the host system on behalf of the library in response to receiving the host command from the host system during a reset of the library by the library controller, wherein in response to the reset, the library controller executes initialization instructions to initialize the library;
   queuing the host commands received during the reset of the library; and
   transmitting the queued host commands received during the reset to the library controller in response to being commanded by the library controller to transmit the queued host commands to the library in response to a complete of the reset of the library.

16. The computer readable storage device of claim 15, wherein queuing the host commands is in response to the drive being commanded by the library controller to queue the host commands received during the reset prior to the complete of the reset of the library.

17. The computer readable storage device of claim 15, wherein queuing the host command is in accordance with a host command polling scheme between the drive and the library.

18. A computer readable storage device storing a program of machine-readable instructions executed by a processor to perform operations for operating a library controller controlling access to data storage media in data storage cartridges in a data storage library, wherein the library is in communication with a host system and includes a drive to receive Input/Output requests from the host system directed to the data storage cartridges, the operations comprising:
   initiating a reset operation to reset the library, wherein in response to the reset, the library executes initialization instructions to initialize the library;
   in response to the reset, causing the drive, during the reset, to queue host commands received from the host system and confirm receipt of the queued host commands to the host system during the reset of the library;
   determining a successful completion of a reset of the library; and
   commanding the drive to transmit any queued host commands to the library in response to the successful completion of the reset of the library and the execution of the initialization instructions.

19. The computer readable storage device of claim 18, the operations further comprising:
   determining the reset of the library is warranted; and
   commanding the drive to queue any host commands received by the drive from the host system on behalf of the library during the reset of the library.

20. The computer readable storage device of claim 18, wherein commanding the drive to transmit any queued host command to the library in response to the successful completion of the reset of the library includes:
   resuming a host command polling scheme between the library and the drive that was suspended during the reset of the library.

* * * * *